Dec. 30, 1958 C. GERST ET AL 2,866,360
POWER TRANSMISSION
Filed June 22, 1955 5 Sheets-Sheet 1
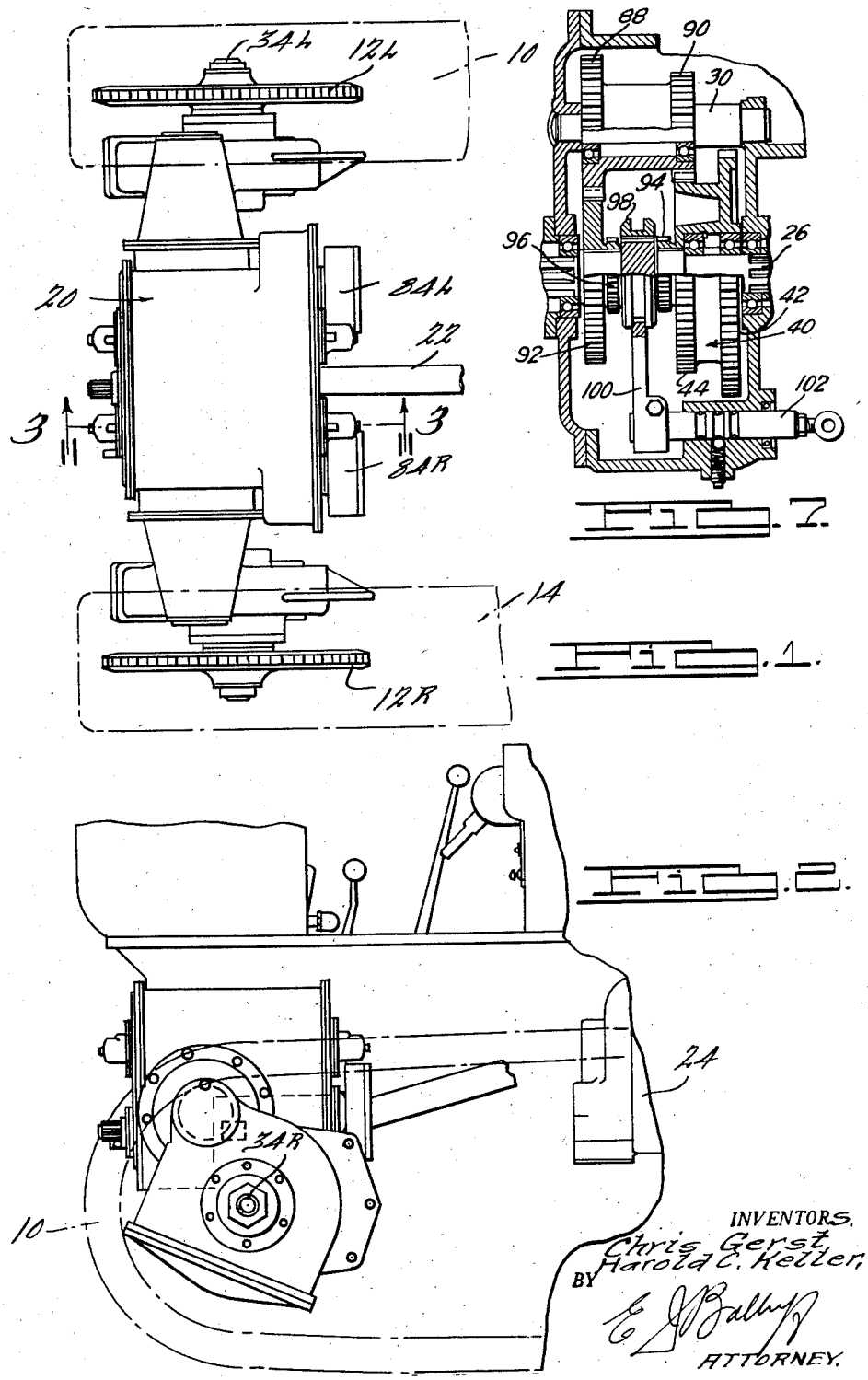
INVENTORS.
Chris Gerst
Harold C. Keller
BY
ATTORNEY.

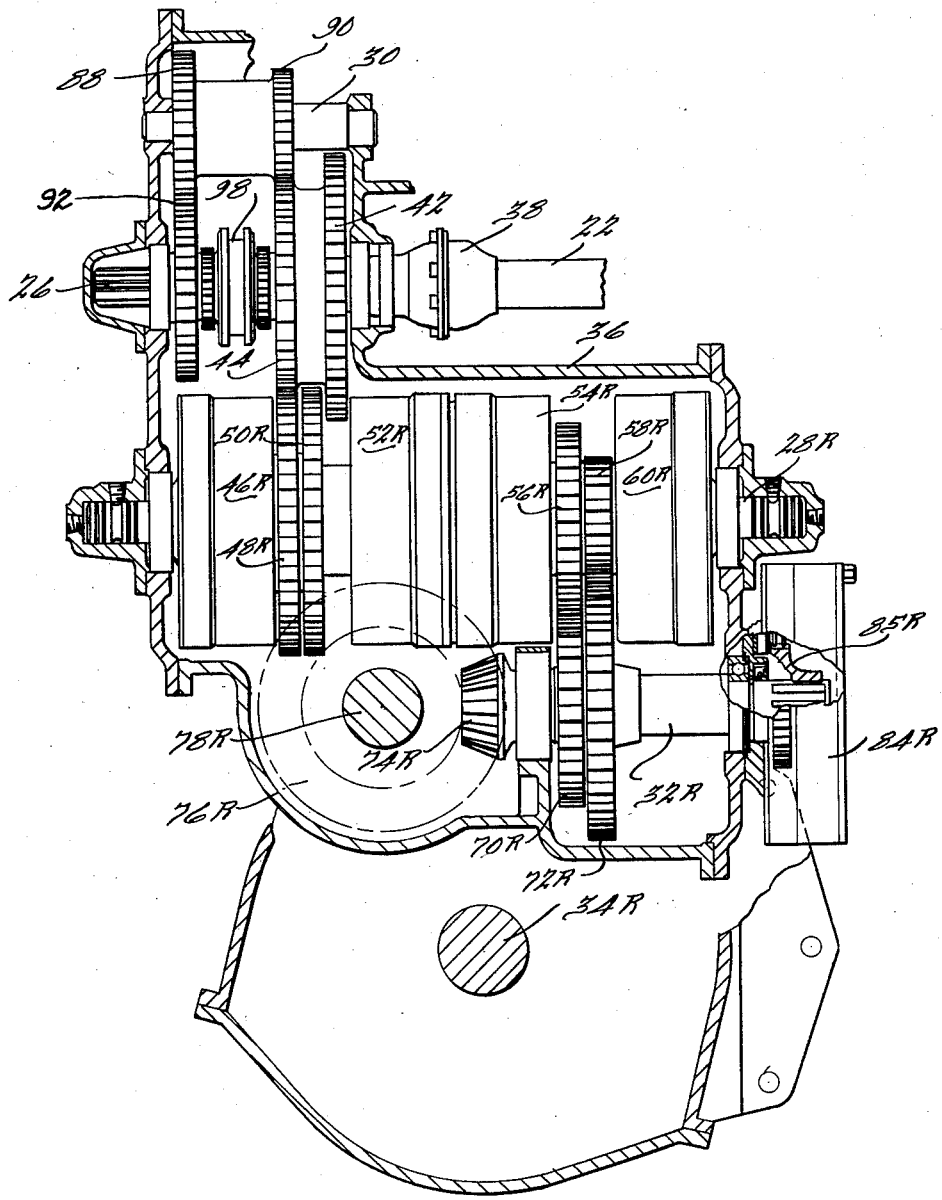

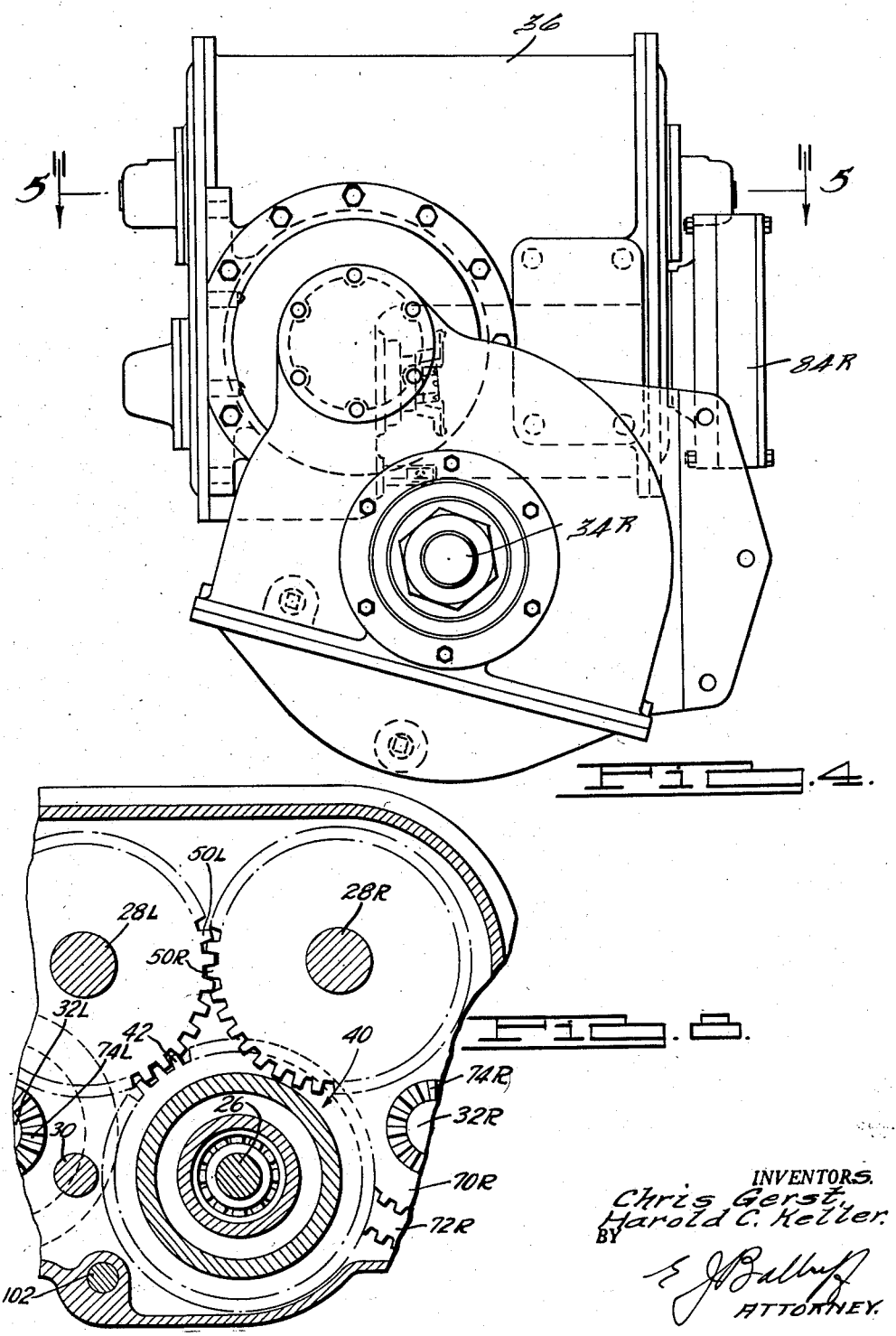

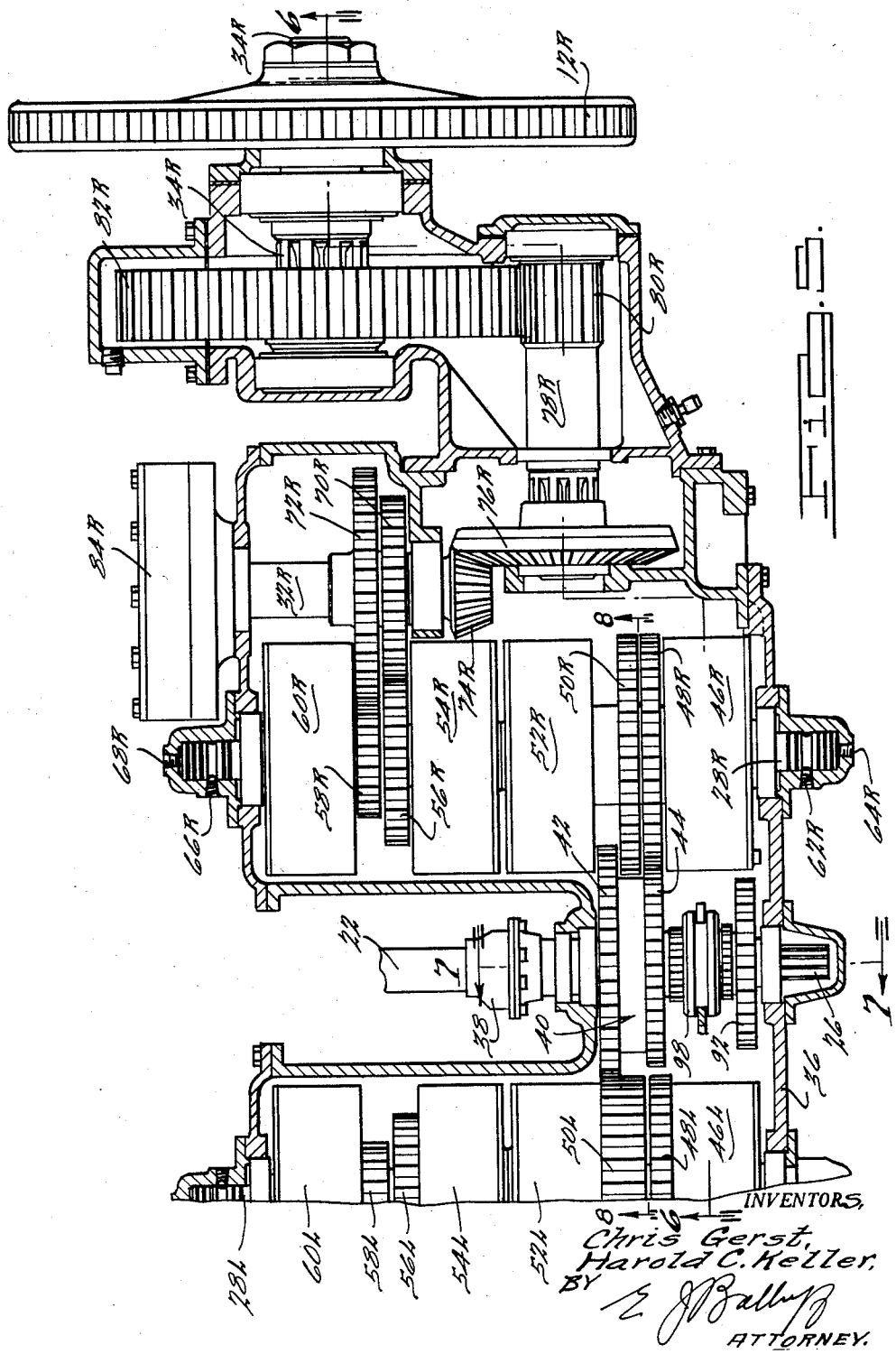

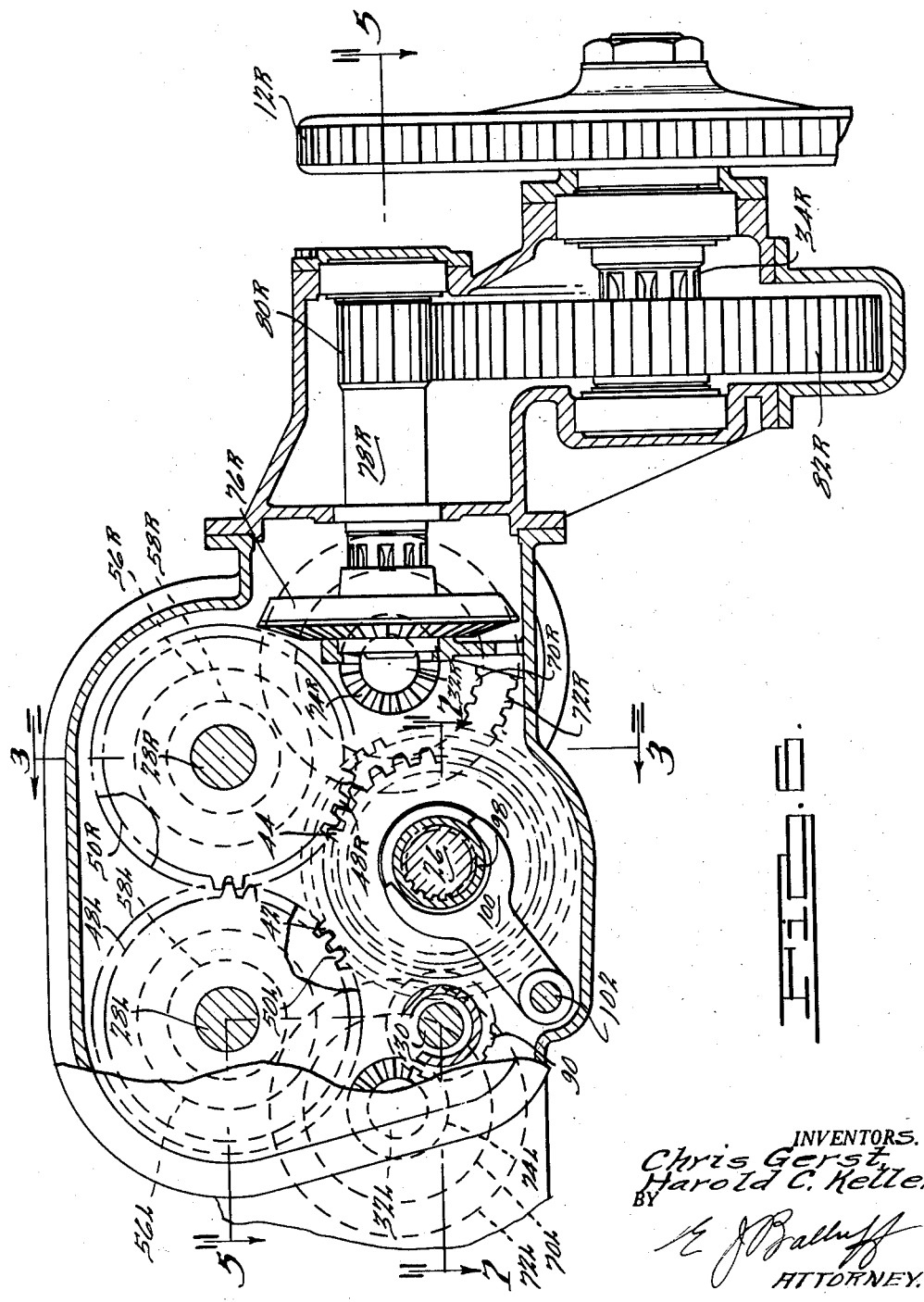

United States Patent Office 2,866,360
Patented Dec. 30, 1958

2,866,360

POWER TRANSMISSION

Chris Gerst, Detroit, and Harold C. Keller, Livonia, Mich., assignors to The Transmission & Gear Company, Dearborn, Mich., a corporation of Michigan Application June 22, 1955, Serial No. 517,284

14 Claims. (Cl. 74—665)

This invention relates to power transmissions and has particular reference to a counterrotating steering axle and transmission for tractors and the like.

The invention is concerned with improvements in transmissions of the type indicated which facilitate the steering and maneuvering of the tractor.

As illustrated in the embodiment of the invention selected for purpose of illustration, a counterrotating steering axle and transmission comprises in general an input shaft, a pair of output shafts disposed in line and transversely of the input shaft, each of the output shafts being adapted to be coupled to a drive sprocket or wheel, and gearing between the input shaft and the output shafts which includes a plurality of fluid pressure actuated clutches, the gearing and clutches being constructed and arranged so that each of the output shafts may be driven from the input shaft independently of the other output shaft in both forward and reverse direction, such gearing including provisions whereby the output shafts may be driven through a number of different gear ratios both forwardly and reversely.

A principal object of the invention is to provide a new and improved power transmission of the counterrotating steering axle and transmission type.

Other and further objects of the invention will be apparent from the following description and claims and may be understood by reference to the accompanying drawings, of which there are five sheets, which by way of illustration show a preferred embodiment of the invention and what we now consider to be the best mode in which we have contemplated applying the principles of our invention. Other embodiments of the invention may be used without departing from the scope of the present invention as set forth in the appended claims.

In the drawings:

Fig. 1 is a plan view of a transmission embodying the invention illustrating the installation thereof in a crawler type tractor;

Fig. 2 is a fragmentary side elevational view of the apparatus shown in Fig. 1 but with one of the tractor treads and the driving sprocket therefor omitted;

Fig. 3 is an enlarged vertical sectional but partially developed view taken generally along the line 3—3 of Figs. 1 and 6;

Fig. 4 is an enlarged side elevational view of the transmission;

Fig. 5 is an enlarged fragmentary developed view taken generally along the line 5—5 of Fig. 6;

Fig. 6 is a fragmentary sectional view taken generally along the line 6—6 of Fig. 5;

Fig. 7 is a fragmentary sectional view taken generally along the line 7—7 of Figs. 5 and 6; and Fig. 8 is a fragmentary sectional view taken generally along the line 8—8 of Fig. 5.

As shown in Figs. 1 and 2, a transmission embodying the invention is illustrated assembled in a crawler type tractor having an endless track 10 adapted to be driven by a sprocket 12L and an endless track 14 adapted to be driven by a sprocket 12R. The sprockets 12L and 12R are each fixed to an output shaft of the transmission indicated generally at 20, and the input shaft of the transmission is adapted to be coupled by a propeller shaft assembly 22 to the output side of a torque converter 24 mounted on the rear end of an engine (not shown) and coupled with the crankshaft thereof.

As the transmission is generally symmetrical with respect to the input shaft, in general only one-half of the transmission is illustrated in detail, and to facilitate the description thereof the letter R will be used with the appropriate reference characters to designate the parts of one-half of the transmission, and the letter L will be associated with the appropriate reference characters to indicate corresponding parts of the other half of the transmission, it being understood that where the letter R or L is used to indicate a part, there is a corresponding part on the other half of the transmission.

As shown in Figs. 3, 5 and 6, the transmission includes an input shaft 26, a pair of intermediate or clutch shafts 28R and 28L, a countershaft 30, a second set of clutch or intermediate shafts like 32R, and output shafts 34R and 34L, the sprocket 12R being keyed to the shaft 34R so as to rotate therewith and the sprocket 12L being keyed to the end of the output shaft 34L so as to rotate therewith.

The input shaft 26 is journaled in suitable bearings in the transmission housing 36 and the forward end of the shaft 26 is connected through a universal joint 38 to the propeller shaft 22. A double drive gear indicated generally at 40 is freely rotatable on the shaft 26 and is formed to provide gears 42 and 44 (Fig. 7). The clutch shaft 28R has mounted thereon a forward drive clutch 46R, a forward drive gear 48R, a reverse drive gear 50R, a reverse drive clutch 52R, a high speed drive clutch 54R, a high speed drive gear 56R, a low speed drive gear 58R, and a low speed drive clutch 60R. The drive gear 44 on the input shaft is directly geared to the forward drive gear 48R on the clutch shaft 28R, while the forward drive gear 42 on the input shaft is directly geared to the reverse drive gear 50L on the clutch shaft 28L.

The clutch shaft 28L has mounted thereon a forward drive clutch 46L, a forward drive gear 48L, a reverse drive gear 50L, a reverse drive clutch 52L, a high speed drive clutch 54L, a high speed drive gear 56L, a low speed drive gear 58L, and a low speed drive clutch 60L, which are the counterparts of the clutches and gears on the shaft 28R.

The reverse drive gear 50R is geared directly to the reverse drive gear 50L so as to be driven thereby from the gear 40, while the forward drive gear 48L is geared directly to the forward drive gear 48R so as to be driven thereby (Fig. 6).

The clutches 46R and L, 52R and L, 54R and L, and 60R and L are normally disengaged. The construction and operation of each of these clutches are the same. The clutches preferably are of the fluid pressure multiple disc type. When the clutch 46R is engaged it directly couples the gear 48R to the clutch shaft 28R so as to establish a two-way driving connection therebetween. When the clutch 52R is engaged, it directly couples the reverse drive gear 50R to the shaft 28R so as to establish a two-way driving connection therebetween. When the clutch 54R is engaged, it directly couples the gear 56R to the shaft 28R so as to establish a two-way driving connection therebetween; and when the clutch 60R is engaged, it directly couples the gear 58R to the shaft 28R so as to establish a two-way driving connection therebetween. The clutches 46R and 52R are engaged by the application of fluid pressure thereto and disengaged when the fluid pressure is released.

The fluid pressure lines of the control system (not shown) for controlling the engagement and disengagement of the clutches 46R and 52R are connected with the ports 62R and 64R which communicate with fluid passageways in the shaft 28R which lead respectively to the clutches 46R and 52R, the arrangement being such that both clutches may be disengaged at the same time, or either may be selectively engaged to provide a forward drive or a reverse drive, as the case may be.

The clutches 54R and 60R are of the same type as clutches 46R and 52R and are controlled in the same way, the clutch 54R when engaged functioning to provide a two-way drive between the gear 56R and the shaft 28R, while the clutch 60R when engaged functions to provide a two-way drive between the gear 58R and the shaft 28R.

The fluid pressure lines of the control system (not shown) for controlling the engagement and disengagement of the clutches 54R and 60R are connected with the ports 66R and 68R which communicate with fluid passageways in the shaft 28R which lead respectively to the clutches 54R and 60R, the arrangement being such that both clutches may be disengaged at the same time or either may be selectively engaged to provide a high speed drive or a low speed drive, as the case may be.

The clutches 54R and 60R normally are disengaged and may both be disengaged at the same time, or the fluid pressure control system may be operated so as to selectively actuate either the clutch 54R or the clutch 60R so that either the gear 56R or 58R will be driven from the shaft 28R. The fluid pressure control system is constructed and arranged so that the controls for the right hand side of the transmission are operable independently of the controls for the left hand side of the system, thus making it possible to drive the sprocket 12R independently of the sprocket 12L in both forward and reverse directions and with the sprocket 12R rotating in the same or in the opposite direction from the sprocket 12L, or with one of the sprockets stationary while the other is being driven.

The gear 56R is geared to gear 70R while the gear 58R is geared to the gear 72R, the gears 70R and 72R being keyed to the shaft 32R which is journaled in suitable bearings. One end of the shaft 32R has affixed thereto a bevel gear 74R, the teeth of which mesh with the teeth of bevel gear 76R which is keyed to shaft 78R. The end 80R of the shaft 78R is provided with gear teeth which mesh with the teeth of gear 82R which is splined to the output shaft 34R. The shaft 34R is journaled in suitable bearings mounted in the transmission housing 36. The shaft 34R projects from one end of the transmission housing 36 and has keyed thereto the drive sprocket 12R.

The shaft 32R projects from the transmission housing and has associated therewith a multiple disc fluid pressure actuated brake 84R which is of essentially the same construction as the clutches 46R etc. The stationary part of the brake 84R is fixedly secured to the transmission housing 36 while the rotary part of the brake 84R is connected to the shaft 32R by means of hub 85R so as to turn therewith. The brake 84R is normally disengaged but is adapted like the clutches 46R etc. to be actuated by fluid pressure to hold the shaft 32R against rotation. Since the shaft 32R is geared to the drive sprocket 12R, it will be apparent that when the brake 84R is applied the drive sprocket 12R will be held against rotation in either direction. The brake 84R is actuated by the fluid pressure control system independently of the clutches 46R etc. or the corresponding brake 84L for the other half of the transmission, and it may be applied when the sprocket 12R is being power driven or when it is idling.

Between the input shaft 26 and the double drive gear 40 a multi-speed drive and clutch structure is arranged, and this consists of the countershaft 30, cluster gears 88 and 90 journaled for rotation on the countershaft 30, and gear 92 journaled for rotation on the input shaft 26. The gears 44 and 92 are each provided with clutch teeth 94 and 96, and a shiftable clutch member 98 slidably splined to the shaft 26 is provided with clutch teeth for selective engagement with the clutch teeth 96 or the clutch teeth 94 so as to selectively couple either the gear 92 or the gear 44 to the shaft 26 for rotation therewith. A fork 100 associated with the shiftable clutch member 98 is carried by a slidable rod 102 which extends externally of the transmission and which is adapted to be operated so as to selectively engage the clutch teeth just described. The teeth 96 together with the teeth of the clutch member 98 constitute a clutch, while the clutch teeth 94 together with the teeth of the clutch member 98 constitute a second clutch. When the teeth of 98 are engaged with the clutch teeth 94, the gear 40 will be coupled directly to the shaft 26 for rotation therewith, while when the teeth of clutch 98 are engaged with the clutch teeth 96, the gear 92 will be coupled directly to the shaft 26 and gear 40 will be driven through the teeth of the cluster gears 90 and 88 and the gear 92 at a speed less than that of the shaft 26. The clutches 94, 96 and 98 and the associated gearing provide what may be termed a range shifter for the transmission, and because of its disposition it doubles the number of gear ratios that the transmission provides between the input shaft 26 and the sprocket 12R through the rest of the transmission gearing.

The housing 36 of the transmission may be made of a number of castings which are rigidly bolted together to enclose the working parts of the transmission and provide a housing for containing lubricant for the gears thereof.

The multiple disc clutches hereinbefore referred to are of the fluid pressure actuated type now in use. These clutches make it possible to rapidly shift the transmission from forward to reverse and from one gear to another without the necessity of synchronizing and/or meshing gear or clutch teeth. These clutches together with the brakes, which are also fluid pressure controlled, make it possible to control the transmission and the tractor with an extremely high degree of flexibility and maneuverability.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

We claim:

1. A counterrotating steering axle and transmission comprising an input shaft, a pair of clutch shafts each having a forward drive gear and a reverse drive gear rotatable thereon independently of each other, a double drive gear on the input shaft and adapted to be driven thereby, said double drive gear being geared to the forward drive gear on one clutch shaft and in parallel therewith geared to the reverse drive gear on the other clutch shaft, said forward drive gears having their teeth in mesh with each other and said reverse drive gears having their teeth in mesh with each other, a pressure actuated forward drive clutch operatively associated with each forward drive gear and its respective shaft and adapted when engaged to provide a driving connection therebetween, a pressure actuated clutch operatively associated with each reverse drive gear and its shaft and adapted when engaged to provide a driving connection therebetween, and a pair of output shafts, each of said output shafts being connected to one clutch shaft, said output shafts being disposed in line with each other and transversely with respect to said input shaft.

2. A transmission according to claim 1 including a multi-speed drive and clutch structure associated with and operatively disposed between said input shaft and the drive gear thereon, said drive and clutch structure including a gear train geared to said double gear and a clutch member rotatable with said shaft, said clutch member being constructed and arranged so that it may be selectively coupled with said double gear or the gear of said train remote from said double gear so as to drive said drive gear on the input shaft at the same or different rates with respect to the rate of said input shaft.

3. A transmission according to claim 1 wherein each of said clutch shafts has a low speed gear and a high speed gear rotatable thereon independently of each other, a pressure actuated drive clutch operatively disposed between each of said high and low speed gears and its respective shaft and adapted to be selectively engaged so as to drive either the low speed gear or the high speed gear, said low and high speed gears and clutches associated therewith forming a part of said driving means by which each of the output shafts is drivingly connected to one of the clutch shafts.

4. A transmission according to claim 1 wherein said input and clutch shafts are disposed in parallel relation to each other and wherein said input and clutch shafts and the gears and clutches associated therewith are disposed between said output shafts.

5. A power transmission comprising an input shaft, a pair of shafts each having a first drive gear and a second drive gear rotatable thereon, said first drive gear on each shaft being mounted thereon for rotation independently of said second drive gear on such shaft, drive gears on the input shaft arranged to be driven simultaneously thereby, one of said drive gears on said input shaft being geared to the first drive gear on one of said shafts of said pair and the other of said drive gears on said input shaft being geared to the second drive gear on the other of said shafts of said pair, said first drive gears being geared to each other and said second drive gears being geared to each other independently of the geared arrangement between said first drive gears, a clutch operatively associated with each of said first drive gears and its respective shaft and adapted when engaged to provide a driving connection therebetween, and a clutch operatively associated with each of said second drive gears and its shaft and adapted when engaged to provide a driving connection therebetween.

6. A power transmission comprising an input shaft, a pair of clutch shafts each having a forward drive gear and a reverse drive gear rotatable thereon, said first drive gear on each shaft being mounted thereon for rotation independently of said second drive gear on such shaft, a drive gear on the input shaft and adapted to be driven thereby, said drive gear on the input shaft being geared to the forward drive gear on one clutch shaft and in parallel therewith also being geared to the reverse drive gear on the other clutch shaft, said forward drive gears being geared to each other and said reverse drive gears being geared to each other independently of the geared arrangement between said forward drive gears, a clutch operatively associated with each forward drive gear and its respective shaft and adapted when engaged to provide a driving connection therebetween, and a clutch operatively associated with each reverse drive gear and its shaft and adapted when engaged to provide a driving connection therebetween.

7. A counterrotating steering axle and transmission comprising an input shaft and a pair of output shafts and clutch controlled gearing between said input shaft and each of said output shafts and constructed and arranged so as to permit the driving of each of said output shafts in both directions independently of the other output shaft, said gearing including a drive gear on the input shaft, forward and reverse independently rotatable drive gears for each of said output shafts, said drive gear on the input shaft being in mesh with the forward drive gear for one of the output shafts and the reverse drive gear for the other of the output shafts, said forward drive gears for said output shafts being in mesh with each other and said reverse drive gears for said output shafts being in mesh with each other, and clutch means for selectively coupling each output shaft to its respective forward or reverse drive gear.

8. A steering axle and transmission comprising a pair of clutch shafts each having a forward drive gear rotatable thereon and a reverse drive gear rotatable thereon independently of said forward drive gear, a drive gear geared to the forward drive gear on one clutch shaft and in parallel therewith also geared to the reverse drive gear on the other clutch shaft, said forward drive gears being geared to each other and said reverse drive gears being geared to each other independently of the geared arrangement between the forward drive gears, a pressure actuated forward drive clutch operatively associated with each forward drive gear and its respective shaft and adapted when engaged to provide a driving connection therebetween, a pressure actuated clutch operatively associated with each reverse drive gear and its shaft and adapted when engaged to provide a driving connection therebetween, and a pair of output shafts drivingly connected with said clutch shafts.

9. A transmission comprising a pair of shafts each having a first drive gear rotatable thereon and a second drive gear rotatable thereon independently of said first drive gear, a drive gear geared to the first drive gear on one shaft and in parallel therewith also geared to the second drive gear on the other shaft, said first drive gears being geared to each other and said second drive gears being geared to each other independently of the geared arrangement between said first drive gears, a clutch operatively associated with each first drive gear and its respective shaft and adapted when engaged to provide a driving connection therebetween, and a clutch operatively associated with each second drive gear and its shaft and adapted when engaged to provide a driving connection therebetween.

10. A transmission according to claim 9 wherein each of said shafts has a low speed gear and a high speed gear rotatable thereon independently of each other, and a clutch operatively disposed between each of said high and low speed gears and its respective shaft and adapted to be selectively engaged so as to drive either the low speed gear or the high speed gear.

11. A transmission comprising a pair of clutch shafts each having a forward drive gear and a reverse drive gear rotatable thereon independently of each other, a driving gear geared to the forward drive gear on one clutch shaft and in parallel therewith geared to the reverse drive gear on the other clutch shaft, said forward drive gears being geared to each other and said reverse drive gears being geared to each other independently of the geared arrangement between the forward drive gears, a drive clutch operatively associated with each forward drive gear and its respective shaft and adapted when engaged to provide a driving connection therebetween, a clutch operatively associated with each reverse drive gear and its shaft and adapted when engaged to provide a driving connection therebetween, a pair of output shafts, and driving means including variable speed gearing coupling each of said output shafts to one of said clutch shafts, said shafts, gears and clutches being symmetrically disposed with respect to said driving gear.

12. A steering axle and transmission comprising an input shaft, a pair of clutch shafts each having a forward drive gear and a reverse drive gear rotatable thereon independently of each other, a drive gear on the input shaft and adapted to be driven thereby, said drive gear on the input shaft being geared to the forward drive gear on one clutch shaft and in parallel therewith geared to the reverse drive gear on the other clutch shaft, said forward drive gears being geared to each other and said reverse drive gears being geared to each other independently of the geared arrangement between the forward drive gears, a pressure actuated forward drive clutch operatively associated with each forward drive gear and its respective shaft and adapted when engaged to provide a driving connection therebetween, a pressure actuated clutch operatively associated with each reverse drive gear and its shaft and adapted when engaged to provide a driving connection therebetween, each of said clutch shafts having a low speed gear and a high speed gear rotatable thereon, a pressure actuated clutch operatively disposed between each of said high and low speed gears and its respective shaft and adapted to be selectively engaged so as to couple either the low speed gear or the high speed gear to its shaft, a pair of intermediate shafts each having gears geared to said high and low speed gears on one of said clutch shafts, and a brake operatively associated with each of said intermediate shafts, a pair of output shafts, and gearing coupling each of said output shafts to one of said intermediate shafts.

13. A transmission according to claim 12 including a multi-speed drive and clutch structure associated with and operatively disposed between said input shaft and the drive gear thereon, said drive and clutch structure including a gear train geared to said double gear and a clutch member rotatable with said shaft, said clutch member being constructed and arranged so that it may be selectively coupled with said double gear or the gear of said train remote from said double gear so as to drive said drive gear on the input shaft at the same or different rates with respect to the rate of said input shaft.

14. A transmission according to claim 12 wherein said input, clutch, and intermediate shafts are disposed in parallel relation to each other and wherein said output shafts are disposed in line with and normal to said other shafts.

References Cited in the file of this patent

UNITED STATES PATENTS

| | | |
|---|---|---|
| 1,112,218 | Kennedy | Sept. 29, 1914 |
| 1,394,131 | Wollesen | Oct. 18, 1921 |
| 1,646,552 | Mosel | Oct. 25, 1927 |
| 1,932,108 | Johnston et al. | Oct. 24, 1933 |
| 2,074,319 | Baker et al. | Mar. 23, 1939 |
| 2,187,967 | Fawick | Jan. 23, 1940 |
| 2,352,478 | Halford | June 27, 1944 |
| 2,553,376 | Le Tourneau | May 15, 1951 |
| 2,596,699 | Lapsley | May 13, 1952 |
| 2,633,754 | Gerst | Apr. 7, 1953 |
| 2,692,514 | O'Leary | Oct. 26, 1954 |
| 2,712,245 | Lee | July 5, 1955 |

FOREIGN PATENTS

| | | |
|---|---|---|
| 317,910 | Germany | Jan. 6, 1920 |
| 483,439 | Great Britain | Apr. 20, 1938 |
| 549,633 | Great Britain | Nov. 30, 1942 |
| 587,418 | Great Britain | Apr. 24, 1947 |